United States Patent
Corless et al.

(10) Patent No.: US 9,834,052 B2
(45) Date of Patent: Dec. 5, 2017

(54) UNIVERSAL MOUNTING BRACKET FOR AN ADAPTABLE HITCH COVER

(71) Applicants: Gerald W. Corless, Streetsboro, OH (US); Steven Duane Miller, Bedford, OH (US); Gregory Y. Rotenberg, Highland Hts., OH (US)

(72) Inventors: Gerald W. Corless, Streetsboro, OH (US); Steven Duane Miller, Bedford, OH (US); Gregory Y. Rotenberg, Highland Hts., OH (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 15 days.

(21) Appl. No.: 13/935,042

(22) Filed: Jul. 3, 2013

(65) Prior Publication Data
US 2014/0015225 A1    Jan. 16, 2014

Related U.S. Application Data

(60) Provisional application No. 61/668,597, filed on Jul. 6, 2012.

(51) Int. Cl.
  *B60D 1/60* (2006.01)
(52) U.S. Cl.
  CPC .................................. *B60D 1/605* (2013.01)
(58) Field of Classification Search
  CPC ....................................................... B60D 1/605

USPC ....................... 280/491.5, 506, 507
See application file for complete search history.

(56) References Cited

U.S. PATENT DOCUMENTS

| | | | | |
|---|---|---|---|---|
| 4,840,392 A | * | 6/1989 | Baskett | B60D 1/363 |
| | | | | 280/477 |
| 5,620,198 A | * | 4/1997 | Borchers | B60D 1/52 |
| | | | | 280/491.5 |
| 6,199,892 B1 | | 3/2001 | Dahl | |
| 6,260,874 B1 | | 7/2001 | Smith et al. | |
| 6,286,392 B1 | | 9/2001 | Smith | |
| 6,463,686 B1 | * | 10/2002 | Eisenbraun | B60D 1/60 |
| | | | | 280/507 |
| 6,908,096 B2 | * | 6/2005 | Lewis | B60D 1/60 |
| | | | | 280/504 |
| 7,125,035 B1 | * | 10/2006 | Huenefeld | B60D 1/58 |
| | | | | 280/507 |
| 2006/0255561 A1 | * | 11/2006 | Tambornino | B60D 1/00 |
| | | | | 280/491.5 |
| 2007/0222186 A1 | * | 9/2007 | Yokosh | B60D 1/60 |
| | | | | 280/507 |
| 2012/0240508 A1 | * | 9/2012 | Maisch | E04C 3/086 |
| | | | | 52/588.1 |

\* cited by examiner

*Primary Examiner* — Jacob Knutson
(74) *Attorney, Agent, or Firm* — McDonald Hopkins LLC

(57) ABSTRACT

A hitch cover is shown and described. The hitch cover may include a base having first and second surfaces, the second surface having at least one engagement member attached thereto. The hitch cover may also include a mounting bracket selectively attached to the at least one engagement member of the base and extending from the second surface wherein the mounting bracket is configured to selectively engage a hitch receiver tube.

19 Claims, 14 Drawing Sheets

UNIVERSAL MOUNTING BRACKET FOR AN ADAPTABLE HITCH COVER

CROSS-REFERENCE TO RELATED APPLICATION

This application claims the benefit of U.S. Provisional Patent Application No. 61/668,597, entitled "Universal Mounting Bracket for an Adaptable Hitch Cover," filed on Jul. 6, 2012, which is hereby incorporated in its entirety by reference.

FIELD OF USE

The present invention is generally related to a universal mounting bracket and, more particularly, to a universal mounting bracket for an adaptable hitch cover.

BACKGROUND

Trailer hitch assemblies are traditionally designed to be mounted to vehicles to allow the towing of trailers or the like. A receiver opening or cavity is often used for the receipt of a hitch or draw bar that carries a hitch ball or other means of allowing connection to a towed vehicle. The receiver opening comes in various sizes, such as to accommodate various towing capabilities. For example, receiver-type trailer hitch assemblies are typically offered with a square receiver opening of 1.25 inches (32 mm) for Class I/II, 2 inches (51 mm) for Class III/IV/V, and some Class V hitches are available in 2.5 inches (64 mm) opening sizes.

When not in use towing a trailer or other towed vehicle, often the receiver opening remains generally exposed to the environment. Covers have been provided for insertion into the receiver opening to improve outward appearances and to provide certain utility. A disadvantage of these previously known covers is that a cover may only be capable of appropriately fitting into a specifically sized hitch receiver opening, i.e., the cover comes in just one size to accommodate a correspondingly sized hitch receiver opening. This may limit the use of such covers and may require a user to purchase a plurality of covers to fit each applicable hitch receiver opening. Still further, typical one-piece molded designed hitch covers are limited in their available uses, which may force the manufacturer to create different hitch covers, unique packaging and additional inventory tracking systems.

Prior art designs may also require a relatively large packaging size such that a limited number of covers may be displayed or stored in a given size shelf space, especially those hitch covers that are a one-piece molded design. The large packaging required creates an inefficient use of sale space and may increase the cost of displaying and offering for sale such prior art designs.

Therefore, there is a need for an improved hitch cover with a mounting system that may be capable of selectively attaching to hitch receiver openings of various sizes and/or that may provide modularity. There is also a need to reduce the packaging size of a hitch cover so that more may be displayed or stocked in a given size shelf space. Still further, there is a need to increase the efficiency of the packaging and the display of such in offering the product for sale. Still further, there is a need for a decorative hitch cover base (usually furnished with graphics, decals, and other art) to be able easily switched to a different decorative base of shape and form. Such a decorative hitch cover may give end users more flexibility and variety of choices to express themselves without the necessity of purchasing additional hitch covers with a predefined tube size, design and shape.

SUMMARY

A hitch cover is shown and described. The hitch cover may include a base having first and second surfaces, the second surface having at least one engagement member attached thereto. The hitch cover may also include a mounting bracket selectively attached to the at least one engagement member of the base and extending from the second surface wherein the mounting bracket is configured to selectively engage a hitch receiver tube.

A hitch cover may include a base and a mounting bracket selectively attached to the base and extending therefrom, where the mounting bracket is configured to selectively engage a hitch receiver tube having a first size. The hitch cover may also include an adapter capable of selectively engaging and generally circumscribing at least a portion of the mounting bracket, where the adapter is configured to selectively engage a hitch receiver tube having a second size, the second size being greater than the first size.

A hitch cover may include a face plate having at least one engagement member and a mounting bracket selectively engageable with the at least one engagement member of the face plate, where the mounting bracket is configured to selectively engage a first hitch receiver tube having a first size. The hitch cover may include at least one biasing member attached to the mounting bracket, where the biasing member is configured to engage a portion of the first hitch receiver tube.

A packaging for a hitch cover may include a face plate, a mounting bracket selectively engageable with the face plate, where the mounting bracket is configured to engage a first hitch receiver tube having a first size, and an adapter selectively engageable with at least a portion the mounting bracket, where the adapter is configured to engage a second hitch receiver tube having a second size, the second size being greater than the first size. The packaging for the hitch cover may also include a retaining member retaining the face plate, mounting bracket and adapter together where the face plate and adapter are disengaged from the mounting bracket when retained in the retaining member, whereby the retaining member is configured to be positioned on a point of sale display.

BRIEF DESCRIPTION OF THE DRAWINGS

The invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 6:
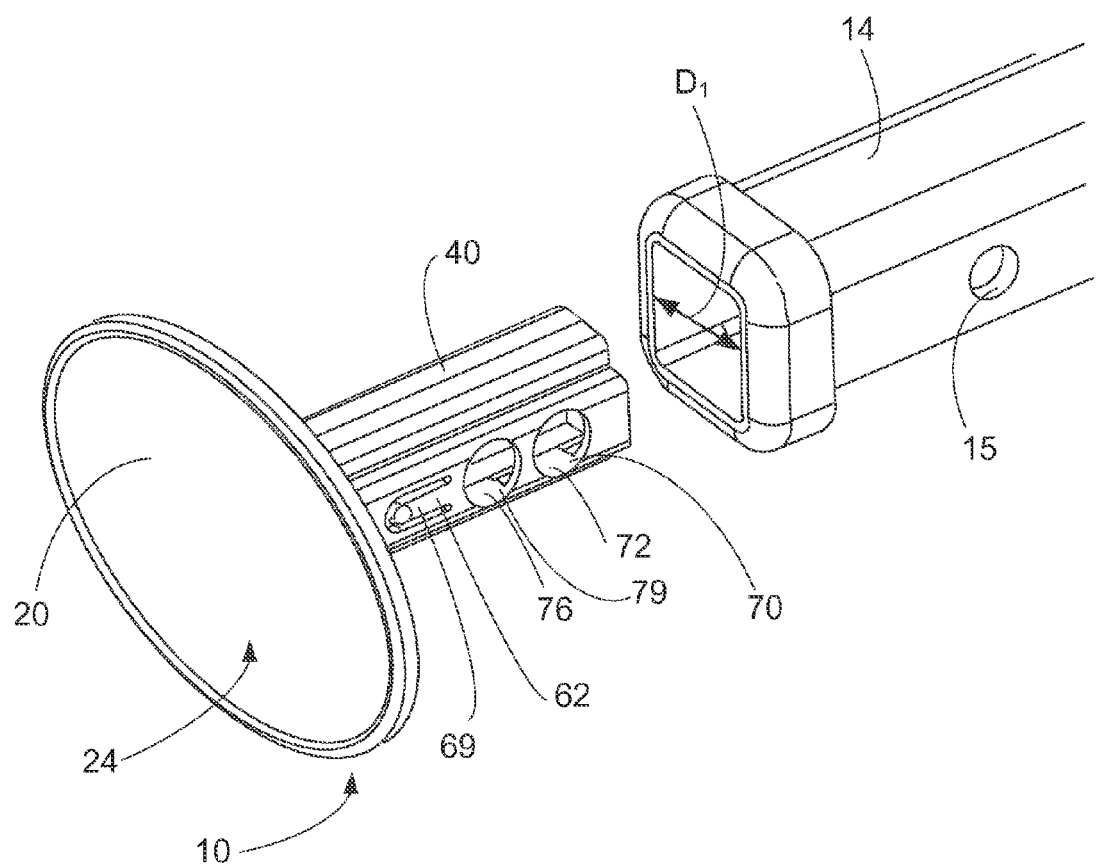
FIG. 6 is a perspective view of the mounting bracket for an adaptable hitch cover being inserted into a hitch receiver tube of a vehicle.
Figure 7:
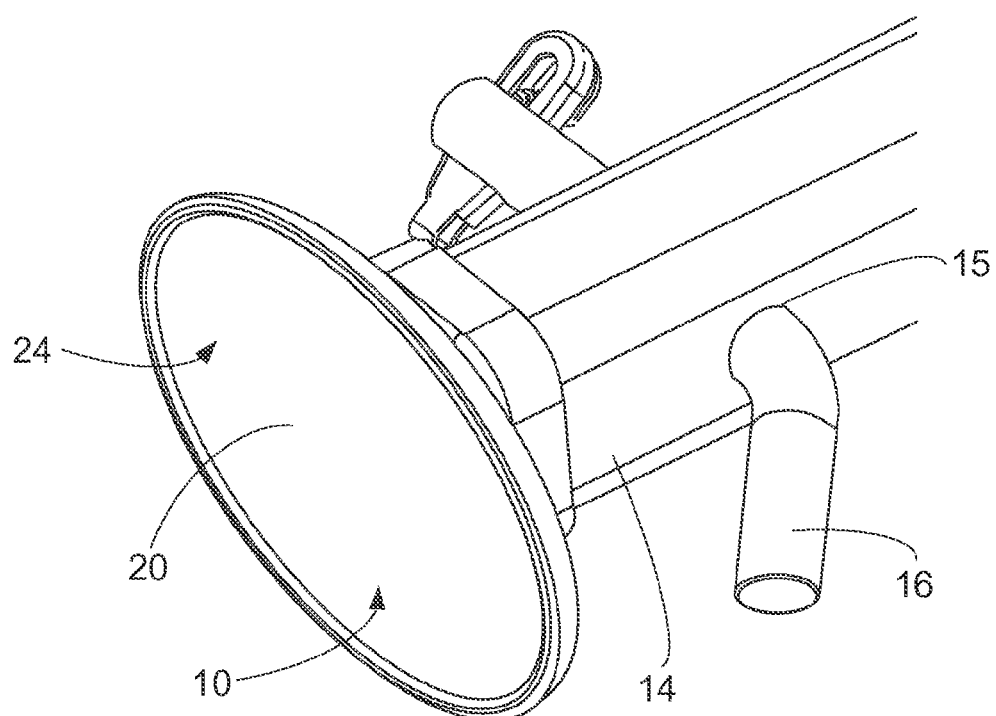
FIG. 7 is a perspective view of the mounting bracket for an adaptable hitch cover selectively secured to the hitch receiver tube.
Figure 8:
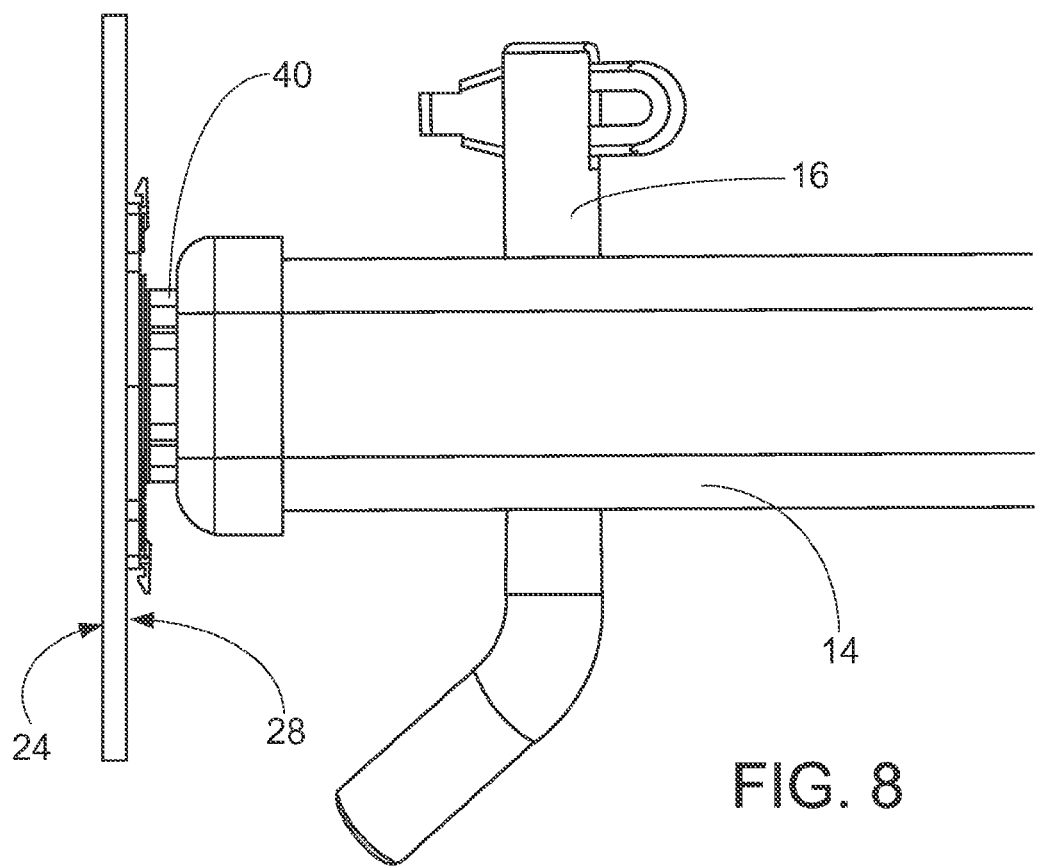
FIG. 8 is a plan view of the mounting bracket for an adaptable hitch cover selectively secured to the hitch receiver tube.

A universal bracket with an adaptable hitch cover 10/100 capable of selectively fitting within a plurality of different sized hitch receiver tubes is shown in FIGS. 1-13. By way of a non-limiting example, the universal bracket with an adaptable hitch cover 10 may be capable of selectively attaching to a hitch receiver tube 14, such as shown in FIGS. 6-8. The hitch receiver tube 14 may be of any appropriate shape and design. The present teachings are not limited to a particular shaped, sized, or configured hitch receiver—any hitch receiver may be used therewith. The hitch receiver tube 14 may include a locking aperture 15 shaped and sized to receive a locking pin 16. The locking pin 16 may of any appropriate design. The locking pin 16 may be capable of being inserted into and through the locking aperture 15, such as to secure a hitch or draw bar of a towed vehicle to the hitch receiver tube 14 in any appropriate manner.

The universal bracket with an adaptable hitch cover 10 may include a base/face plate 20. The face plate 20 may include first and second surfaces 24, 28. The first surface 24 may include any appropriate design or indicia, such as by way of a non-limiting example, a logo, a name, an image, or any combination of such. For example, the universal bracket with adaptable hitch cover 10 may be furnished with certain graphics, decals, or other art work that may be selectively attached to the first surface 24 in any appropriate manner. Users may also be able to replace such graphics, decals or other art work with any other graphic, decal or art work that they choose, which may provide customization to the universal bracket with adaptable hitch cover 10. Still further, the first surface 24 may include any appropriate object, such as a light, bottle opener, or any such other device that may be attached thereto or formed therewith. Such device may provide additional utility to the universal bracket with an adaptable hitch cover 10. Further, the first surface 24 may be a contoured or include a shaped three-dimensional surface having a desired shape or configuration, i.e., the first surface 24 need not be planar, it may contain contours, depressions or both.

The second surface 28 may include at least one engagement member 30. In some embodiments, the second surface 28 may include four engagement members 30; see FIG. 1. While four engagement members 30 may be shown and described, the present teachings are not limited to four such engagement members 30. Any appropriate number of engagement members 30 may be used without departing from the present teachings. The engagement members 30 may include a plurality of hooks 34 that may be appropriately spaced on the second surface 28 of the face plate 20, such as by way of a non-limiting example, in a generally rectangular shape. The hooks 34 may be attached in any appropriate manner. By way of a non-limiting example, the hooks 34 may be attached by fastening, securing, snap-fitting, welding, or otherwise adhered. Further, the hooks 34 may be integrally formed on the second surface 28 as a monolithic unit, such as through any appropriate molding process or the like.

The universal bracket with an adaptable hitch cover 10 may include a mounting bracket 40 that may be selectively attached to the face plate 20. In particular, the mounting bracket 40 may be selectively attached the second surface 28 of the face plate 20. The mounting bracket 40 may be selectively attached to the engagement members 30 of the second surface 28 of the face plate 20. The mounting bracket 40 may include a base 42 that may be of a shape and size that it may be capable of selectively engaging the engagement members 30 in any appropriate manner, such as by way of a non-limiting example, snap-fit, friction fit, mating engaging features, or the like.

The base 42 may be integrally formed with the mounting bracket 40 as a monolithic unit or may be attached thereto through a subsequent operation. By way of a non-limiting example, the base 42 may be of a generally rectangular shape. The base 42 may include openings 43 that may selectively engage the engagement members 30. More specifically, the openings 43 may be shaped and sized such that the hooks 34 may selectively engage the openings 43 generally securing the mounting bracket 40 with the second surface 28 of the face plate 20; see FIG. 5. The base 42 may be positioned toward the second surface 28 of the face plate 20 generally aligning openings 43 with the hooks 34, as shown by arrow 45. A force may be applied as in the direction of the arrow 60, which may position the openings 43 with the hooks 34. In some embodiments, the number of openings 43 may generally match the number of engagement members 30, e.g., four, and the position of the openings 43 may generally correspond with the position of the engagement members 30. The hooks 34 may also be disengageable with the base 42 of the mounting bracket 40 such that the mounting bracket 40 may be selectively disengaged from the face plate 20, i.e., the mounting bracket 40 and the face plate 20 may be modular. In such embodiments, a different face plate 20 may be attached to the mounting bracket 40 as required or desired. This may allow a user to selectively attach another face plate 20 to the mounting bracket 40, such as to provide a face plate with a different indicia, different device attached thereto, or one capable of a different function. Still further, this may allow the face plate 20 to be packaged disengaged from the mounting bracket 40, which is described in more detail below, and may allow a user to store the face plate 20 separate from the mounting bracket 40.

In some embodiments, the mounting bracket 40 may include first and second housings 44, 48. The first housing 44 may include a first interlocking feature 50 and the second housing 48 may include a second interlocking feature 52. The second interlocking feature 52 may be capable of selectively engaging the first interlocking feature 50 for the purpose of interlocking the first and second housings 44, 48, which may form the mounting bracket 40 as well as the base 42. Specifically, the first housing 44 may include a first portion 42a of the base 42 and the second housing 48 may include a second portion 42b of the base 42 such that when the first and second housings 44, 48 are interlocked, the first and second portions 42a, 42b form the base 42 with openings 43.

In some embodiments, the first interlocking feature 50 may include a groove 56 extending along a perimeter 57 of the first housing 44 and the second interlocking feature 52 may include a matingly shaped and sized tongue 58 extending along a perimeter 59 of the second housing 48. The tongue 58 may be capable of selectively and operatively engaging the groove 56. It should be understood, however, that the first and second interlocking features 50, 52 may include any appropriate matingly engaging features and are not limited to that shown and described herein. By way of a non-limiting example, the first and second interlocking features 50, 52 may be a male and female snap fit features, male and female dovetail features, or any other appropriate matingly engaging features.

Further, while the first interlocking feature 50 is shown as the groove 56 and the second interlocking feature 52 is shown as the tongue 58, the first interlocking feature 50 may be a tongue and the second interlocking feature 52 may be a groove. Still further, one side of the perimeter 57 of the first housing 44 may include a first interlocking feature 50 that may be a groove and the other side of the perimeter 57 may include a first interlocking feature 50 that may be a tongue. The second housing 48 may include the second interlocking feature 52 that may be capable of matingly engaging the first interlocking feature 50, i.e., a first side of the perimeter 59 of the second interlocking feature 52 may be a tongue and the second side of the perimeter 59 may include the second interlocking feature 52 that may be a groove. The present teachings are not limited to that shown and described. Any appropriate interlocking elements may be utilized in any appropriate configuration and are not limited to that shown and described herein.

Figure 1:
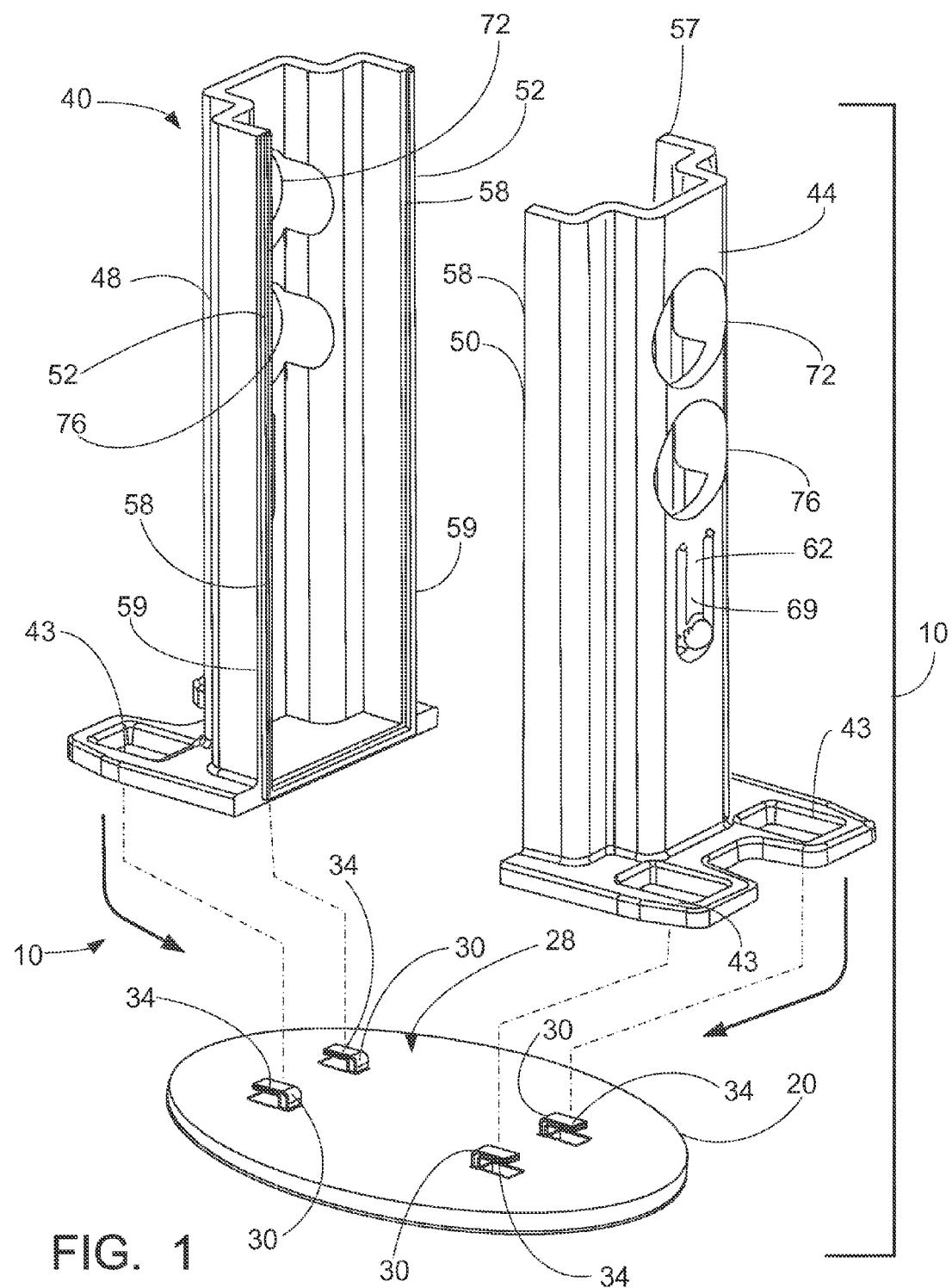
FIG. 1 is an exploded view of a mounting bracket for an adaptable hitch cover.
Figure 2:
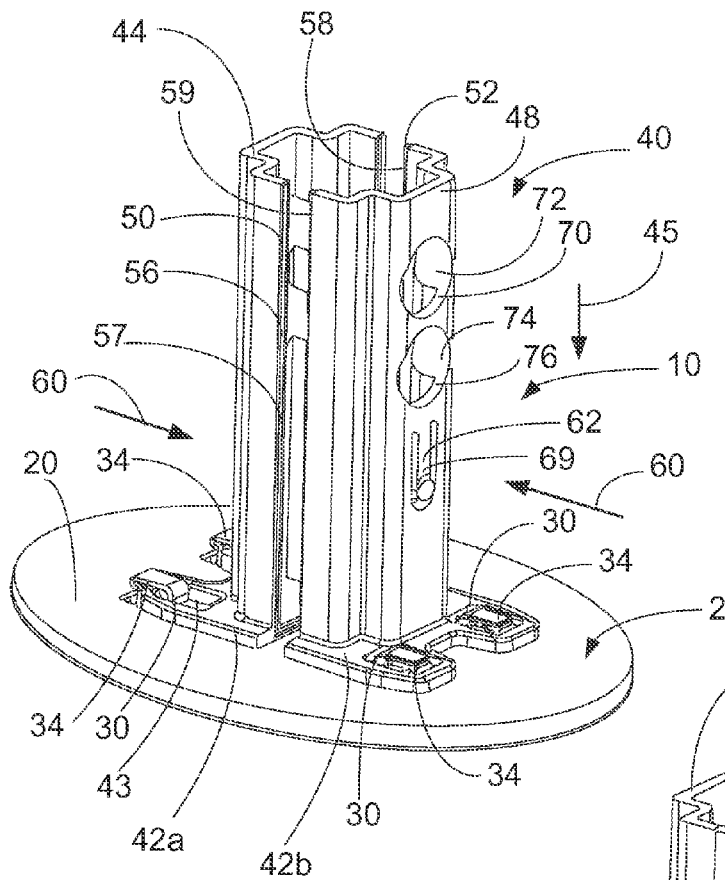
FIG. 2 is a partial exploded view of the mounting bracket for an adaptable hitch cover of FIG. 1.
Figure 3:
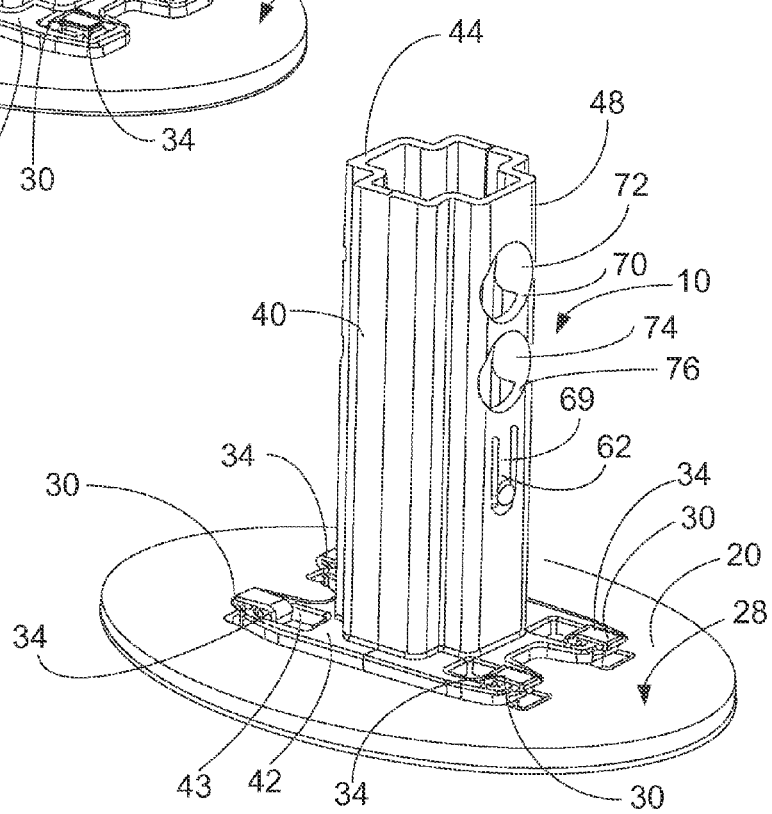
FIG. 3 is a perspective view of the mounting bracket for an adaptable hitch cover.
Figure 4:
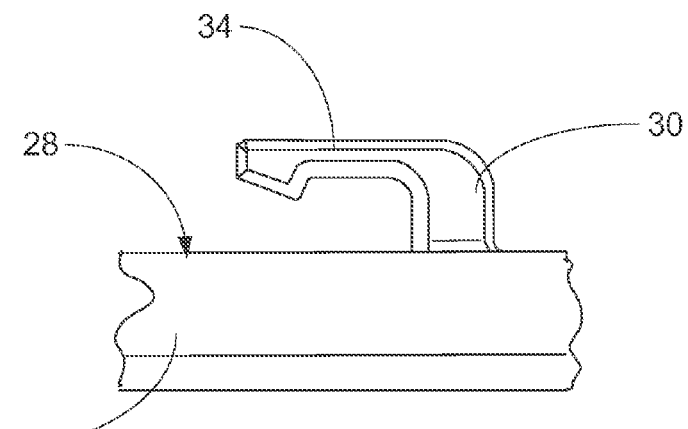
FIG. 4 is an elevation view of a portion of the face plate of the adaptable hitch cover.
Figure 5:
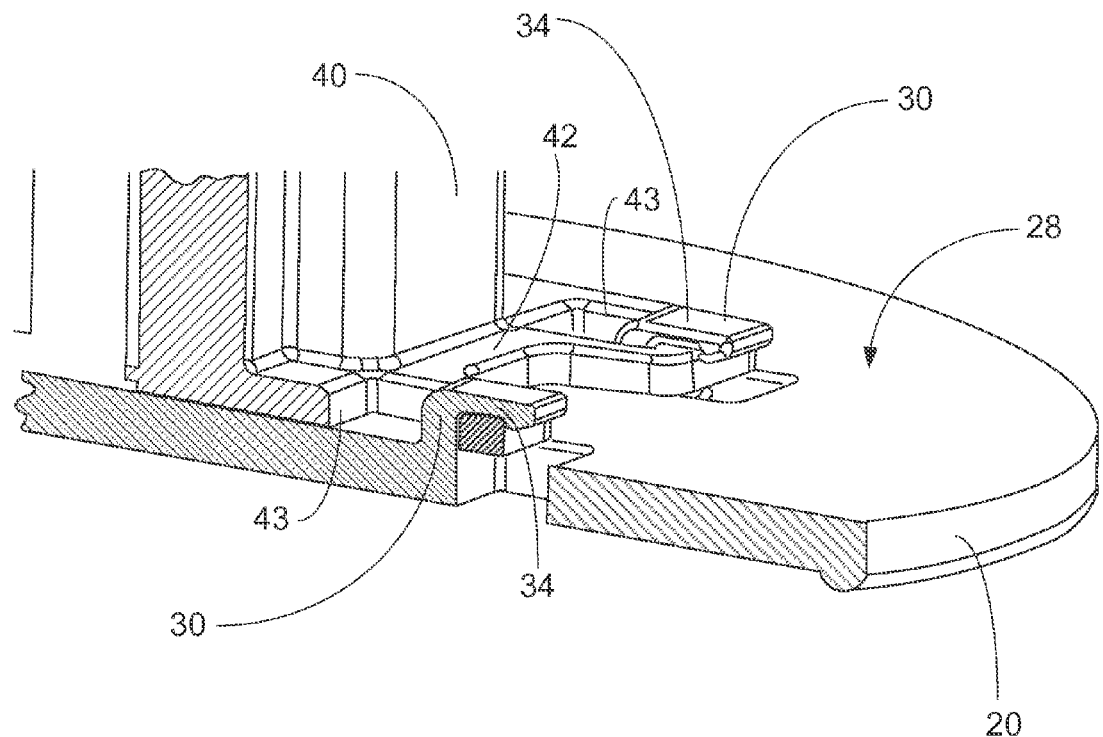
FIG. 5 is a partial cross-sectional view of a portion of the mounting bracket for an adaptable hitch cover.

With the first and second housings 44, 48 positioned on the second surface 28 of the face plate 20 as shown in FIG. 2 and described above, the first and second housings 44, 48 may be selectively moved toward each other as shown by arrows 60. Moving the first and second housings 44, 48 in the direction of arrows 60 may engage the first and second interlocking features 50, 52 with each other operatively securing the first and second housings 44, 48 together. This may form the mounting bracket 40. It is to be understood, however, that the mounting bracket 40 may be formed in any suitable manner and is not limited to that shown and described herein.

The mounting bracket 40 may include an anti-rattle member 62. The anti-rattle member 62 may generally fill a gap between the mounting bracket 40 and the interior surface of hitch receiver tube 14 in which it may be inserted that may have otherwise been present. Filling the gap may create a snug fit between the universal bracket with an adaptable hitch cover 10 and the hitch receiver tube 14. Further, the anti-rattle member 62 may be generally flexible, such that it may be capable of biasing in an appropriate direction. The biasing of the anti-rattle member 62 may allow for absorption of vibration due to road conditions during operation of a vehicle 64 to which the hitch receiver tube 14 may be attached.

In some embodiments, the anti-rattle member 62 may include a finger or tab 69 that may be biased away from the mounting bracket 40. The finger 69 may be attached to the mounting bracket 40 in any appropriate manner or may be integrally formed therewith as a monolithic unit. Each of the first and second housing 44, 48 may include the anti-rattle member 62, i.e., each of the first and second housing 44, 48 may include the finger 69. While each of the first and second housings 44, 48 are shown as having the finger 69, the first and second housings 44, 48 may include any appropriate number of fingers 69, such as two, three or more. Still further, while it is described that both the first and second housing 44, 48 may include the finger 69, either one of the first or second housing 44, 48 may include the finger 69 without departing from the present teachings. Moreover, while a single finger 69 may be described below in more detail, it should be understood that such description may apply to each of the fingers 69. It should also be understood that each of the fingers 69 may have a different construction—the present teachings are not limited to the fingers 69 all being the substantially similar.

The finger 69 may be capable of being compressed toward the mounting bracket 40 when the mounting bracket 40 is being inserted into the hitch receiver tube 14. In such situations, the finger 69 may be depressed or biased downward such that the mounting bracket 40 may be selectively inserted into the hitch receiver tube 14. Once appropriately positioned within the hitch receiver tube 14, the finger 69 may bias toward the hitch receiver tube 14. In biasing toward the hitch receiver tube 14, the finger 69 may engage a portion of the hitch receiver tube 14 creating a generally tight fit, e.g., a tight friction fit, between the mounting bracket 40 and the hitch receiver tube 14. This may allow the mounting bracket 40 to be appropriately positioned within the hitch receiver tube 14. Still further, the finger 69 being elastic may generally dampen vibrations that may occur during operation of the vehicle 64.

The mounting bracket 40 may include at least one locking aperture 70 that may be shaped and sized to accept the locking pin 16. The locking aperture 70 may extend through both sides of the mounting bracket 40. Specifically, each of the first and second housings 44, 48 may include apertures 72 such that when the first and second housings 44, 48 are engaged together as described above, the apertures 72 form the locking aperture 70. The locking aperture 70 may be positioned on the mounting bracket 40 such that it may generally align with the applicable locking pin aperture 15 of the hitch receiver tube 14 when the mounting bracket 40 is inserted into the hitch receiver tube 14.

In some embodiments, the mounting bracket 40 may include a second locking aperture 74. Each of the first and second housings 44, 48 may include second apertures 76 such that when the first and second housings 44, 48 are engaged together as described above, the second apertures 76 form the second locking aperture 74. While two locking apertures 70, 74 are shown and described, the present teachings are not limited to such. Any appropriate number of locking apertures may be used. The locking aperture 70 and the second locking aperture 74 may be positioned on the mounting bracket 40 such that at least one of such generally aligns with the applicable locking pin aperture 15 of the hitch receiver tube 14 when the mounting bracket 40 is inserted into the hitch receiver tube 14. The second locking aperture 74 may allow the mounting bracket 40 to be secured to a wider variety of hitch receiver tubes as the mounting bracket 40 may include at least two apertures that may generally align with the locking pin aperture 15 of the hitch receiver tube 14.

The mounting bracket 40 may be inserted into the hitch receiver tube 14 and the fingers 69 may generally permit a tight fit between the mounting bracket 40 and the hitch receiver tube 14. Either of the locking aperture 70 or the second locking aperture 74 may generally align with the locking pin aperture 15 of the hitch receiver tube 14. The locking pin 16 may be inserted into and through the locking pin aperture 15 and either of the locking aperture 70 or the second locking aperture 74 generally securing the mounting bracket 40 with the hitch receiver tube 14. This may secure the universal bracket with adaptable hitch cover 10 with the hitch receiver tube 14.

The finger 69 may be compressed toward the mounting bracket 40, which may also allow the universal bracket with an adaptable hitch cover 10 to be selectively removable from the hitch receiver tube 14. In such situation, the locking pin 16 may be withdrawn from the locking pin aperture 15 and either of the locking aperture 70 or the second locking aperture 74. The mounting bracket 40 may be pulled outward from the hitch receiver tube 14. As the mounting bracket 40 is so pulled, the finger 69 may compress toward the mounting bracket 40 generally releasing the engagement between the finger 69 and the hitch receiver tube 14 such that the universal bracket with an adaptable hitch cover 10 may be selectively removed.

In some embodiments, the universal bracket with an adaptable hitch cover 10 may be shaped and sized such that it may selectively engage hitch receiver tubes 14 of a dimension $D_1$, such as by way of a non-limiting example, a 1¼" (Class I/II) hitch receiver tubes. By way of a non-limiting example, the mounting bracket 40 may be of a shape and size such that it may being inserted into and operatively engaged with Class I/II hitch receiver tubes 14, i.e., the mounting bracket 40 may have a width $W_1$ capable of fitting within the applicable Class I/II hitch receiver tube 14 of dimension $D_1$. The biasing of the finger 69 toward the hitch receiver tube 14 may permit a tight fit between the universal bracket with adaptable hitch cover 10 and the hitch receiver tube 14 even when the mounting bracket 40 may have a width $W_1$ that may be smaller than other mounting brackets that may fit snugly within the hitch receiver tube 14. This may allow the mounting bracket 40 and in turn the universal bracket with adaptable hitch cover 10 to snugly fit within a wide variety of hitch receiver tubes.

The modularity of the universal bracket with an adaptable hitch cover 10, i.e., the face plate 20 capable of being selectively removable from the mounting bracket 40, may allow the universal bracket with adaptable hitch cover 10 to be efficiently packaged. By way of a non-limiting example, the face plate 20 may be detached from the mounting bracket 40 in the applicable packaging. This selective detachability of the face plate 20 with the mounting bracket 40 may permit the packaging thereof to be more efficient, e.g., this may result in a smaller overall package size as opposed to packaging the face plate 20 attached with the mounting bracket 40. This smaller package size may take up less space on store shelves. It may also be easier for a user to handle and may allow the manufacturer thereof to transport such more efficiently as more of the product may be capable of being packaged in a smaller space.

Still further, the universal bracket with an adaptable hitch cover 10 being selectively attachable to hitch receiver tubes of different sizes may result in having to produce a single design as opposed producing multiple different sized and shaped hitch covers. The universal bracket with adaptable hitch cover 10 may result in generally eliminating additional production lines, separate packaging designs and additional inventory tracking systems.

Additional embodiments of a universal bracket with an adaptable hitch cover according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired universal bracket with an adaptable hitch cover without departing from the spirit and scope of the present teachings.

Figure 9:
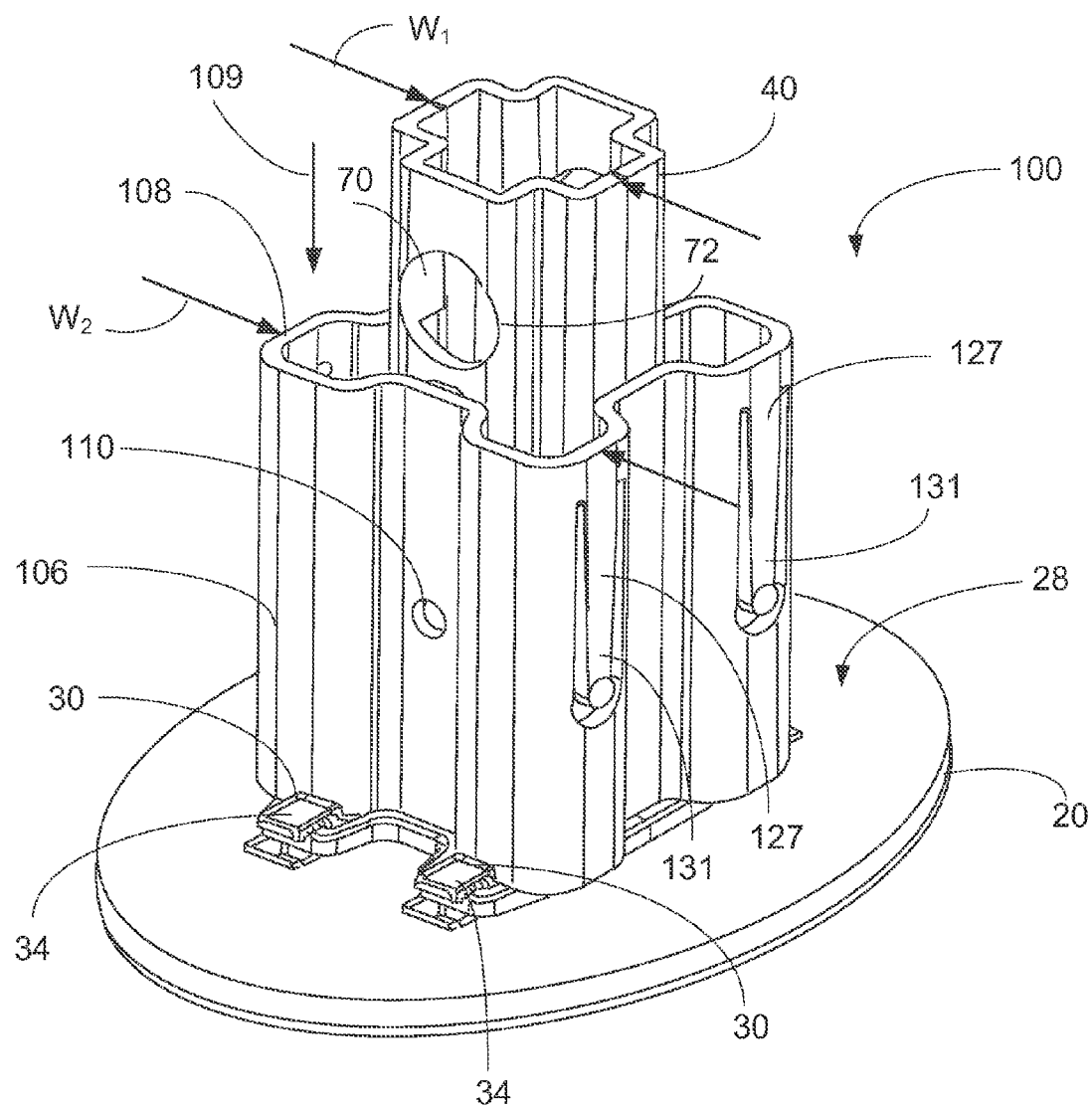
FIG. 9 is a perspective view of the mounting bracket for an adaptable hitch cover with an adapter attached thereto.
Figure 10:
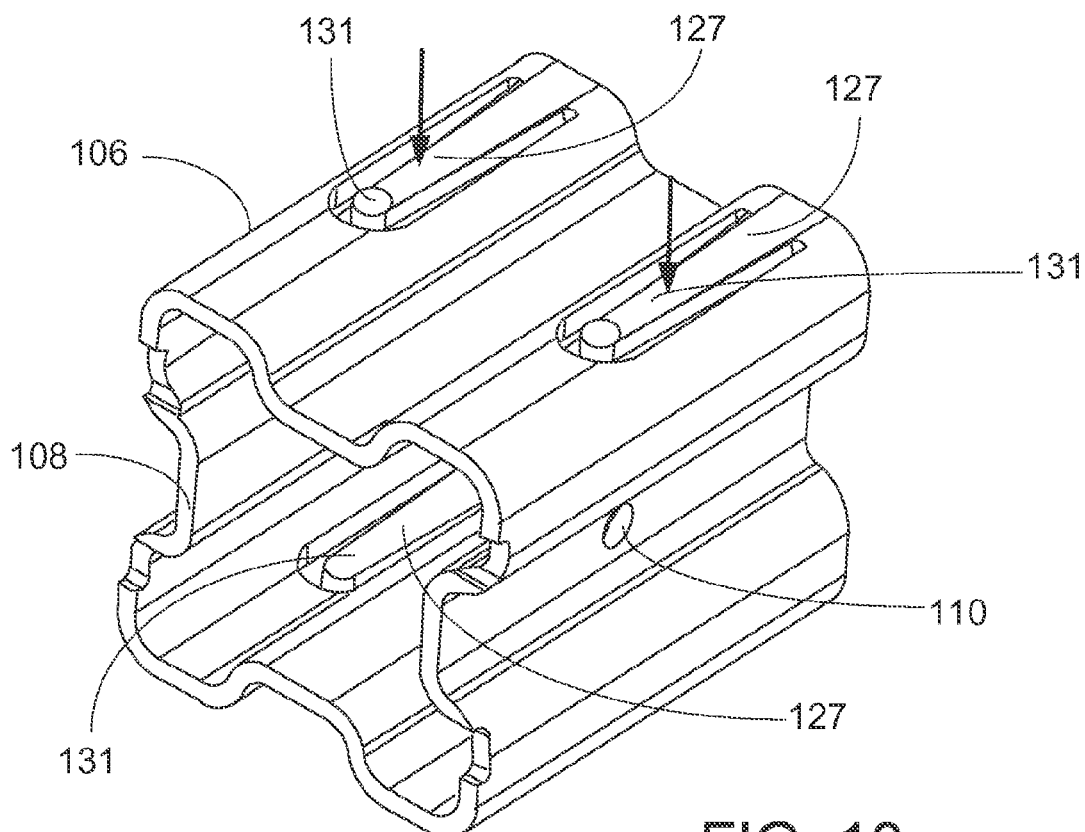
FIG. 10 is a perspective view of the adapter of the mounting bracket for an adaptable hitch cover of FIG. 9.
Figure 11:
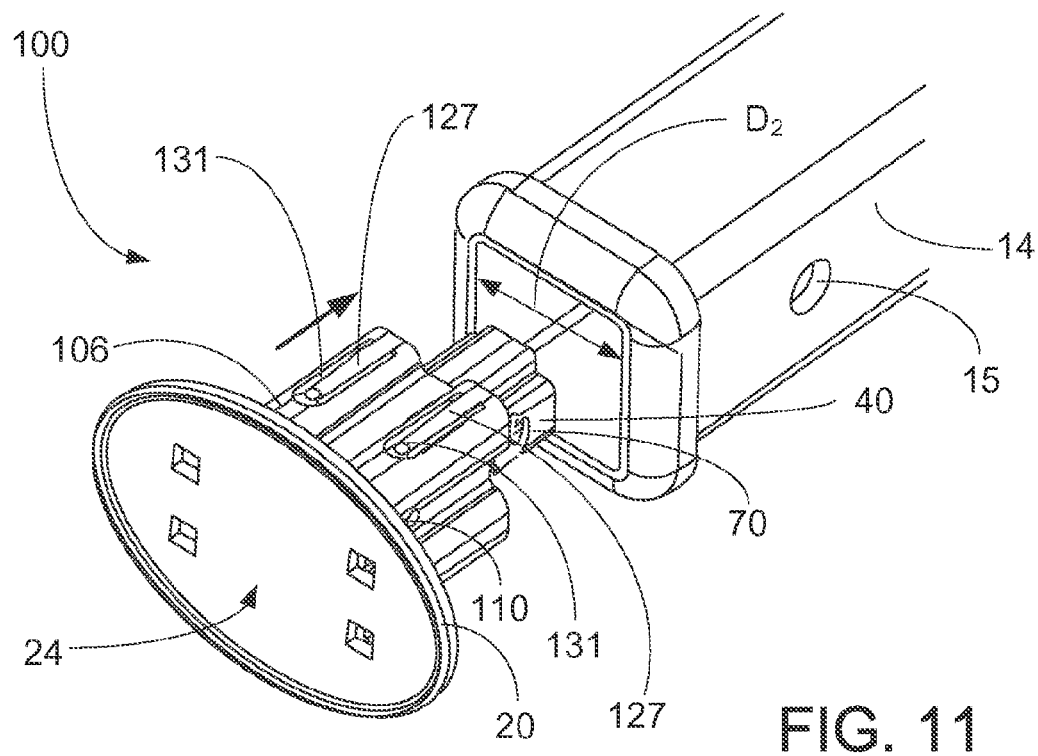
FIG. 11 is a perspective view of the mounting bracket for an adaptable hitch cover being inserted into a hitch receiver tube of a vehicle.
Figure 12:
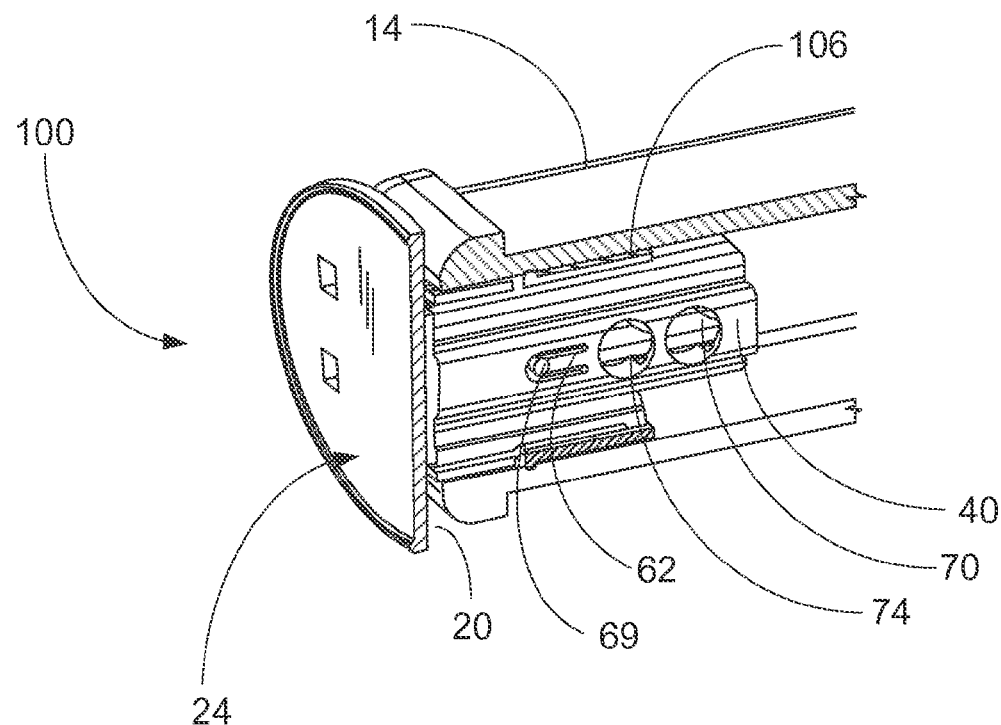
FIG. 12 is a cross-sectional view of the mounting bracket for an adaptable hitch cover selectively inserted into the hitch receiver tube of a vehicle.
Figure 13:
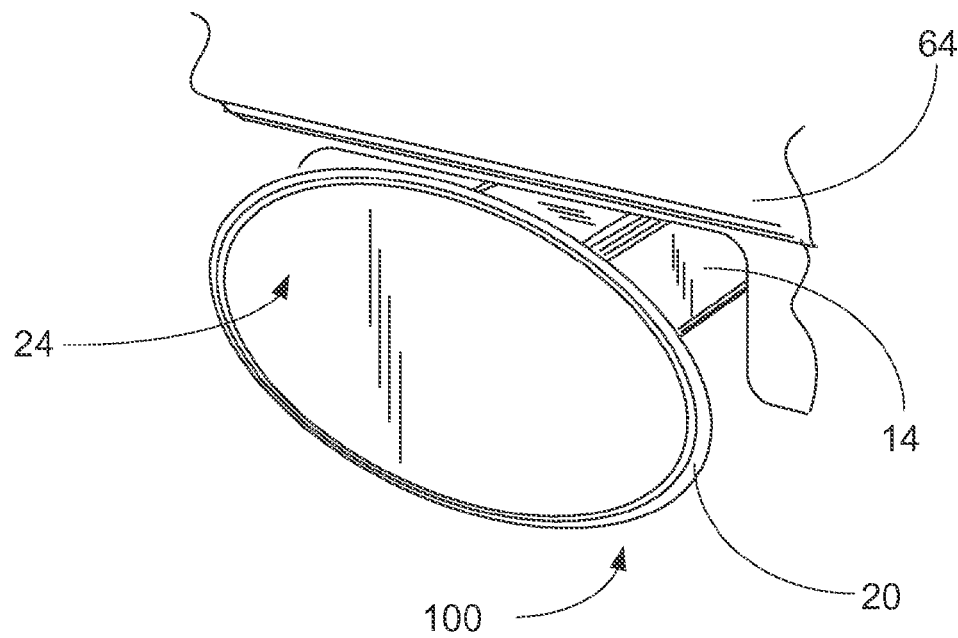
FIG. 13 is a perspective view of the mounting bracket for an adaptable hitch cover selectively secured to the hitch receiver tube of a vehicle.

A universal bracket with an adaptable hitch cover 100 may include the face plate 20 and the mounting bracket 40 as described in more detail above. The universal bracket with an adaptable hitch cover 100 may also include an adapter 106 that may be capable of selectively attaching to the mounting bracket 40 in any appropriate manner. In some embodiments, the adapter 106 may include an opening 108 through which the mounting bracket 40 may pass through, such as in the direction of arrow 109 shown in FIG. 9. The adapter 106 may be of a shape and size such that when it is selectively attached to the mounting bracket 40 at least one of the locking aperture 70 or the second locking aperture 74 may extend beyond the adapter 106, such as shown in FIG. 9. The adapter 106 may include an aperture 110 as described in more detail below. The aperture 110 may be of any appropriate shape and size.

In some embodiments, the anti-rattle member 62 of the mounting bracket 40 may selectively engage the adapter 106 in any appropriate manner securing the adapter 106 with the mounting bracket 40. By way of a non-limiting example, the finger 69 may be compressed toward the mounting bracket 40 when the mounting bracket 40 is being inserted into the adapter 106. In such situations, the finger 69 may be depressed or biased downward such that the mounting bracket 40 may be selectively inserted into the opening 108 of the adapter 106. Once appropriately positioned within the adapter 106, the finger 69 may bias toward adapter 106. In biasing toward the adapter 106, the finger 69 may engage the aperture 110 of the adapter 106 locking the adapter 106 with the mounting bracket 40.

The finger 69 being compressed toward the mounting bracket 40 also may allow the mounting bracket 40 to be selectively removable from the adapter 106. In some embodiments, the mounting bracket 40 may be pulled outward from the adapter 106. As the mounting bracket 40 is so pulled, the finger 69 may compress toward the mounting bracket 40 generally releasing engagement between the finger 69 and adapter 106 such that the mounting bracket 40 may be selectively removed.

The adapter 106 may be formed in any appropriate manner. By way of a non-limiting example, the adapter 106 may be formed as a monolithic member or may be formed from a pair of interlocking housings similar to that of the mounting bracket 40. The present teachings are not limited to any particular configuration.

The adapter 106 may include an anti-rattle member 127. The anti-rattle member 127 may be similar to the anti-rattle member 62, or in the alternative may be of a generally different configuration. The anti-rattle member 127 may generally fill a gap between the adapter 106 and the hitch receiver tube 14 that may have otherwise been present when inserting the universal bracket with an adaptable hitch cover 100 into the hitch receiver tube 14. Filling the gap may create a snug fit between the universal bracket with an adaptable hitch cover 100 and the hitch receiver tube 14. Further, the anti-rattle member 127 may be generally flexible, such that it may be capable of biasing. The flexibility of the anti-rattle member 127 may allow for absorption of vibration due to road conditions during operation of a vehicle 64 to which the hitch receiver tube 14 may be attached.

In some embodiments, the anti-rattle member 127 may include a finger or tab 131 that may be biased away from the adapter 106. The finger 131 may be attached to the adapter 106 in any appropriate manner or may be integrally formed therewith as a monolithic unit. Any appropriate number of fingers 131 may be used without departing from the present teachings. By way of a non-limiting example, the adapter 106 may include four fingers 131, whereby two fingers 131 may be positioned on each side of the adapter 106. Moreover, while a single finger 131 may be described below in more detail, it should be understood that such description may apply to each of the fingers 131. It should also be understood that each of the fingers 131 may have a different construction—the present teachings are not limited to the fingers 131 all being the substantially similar.

The finger 131 may be capable of being compressed toward the adapter 106 when the adapter 106 is being inserted into the hitch receiver tube 14. In such situations, the finger 131 may be depressed or biased downward such that the adapter 106 may be selectively inserted into the hitch receiver tube 14. Once appropriately positioned within the hitch receiver tube 14, the finger 131 may bias toward the hitch receiver tube 14. In biasing toward the hitch receiver tube 14, the finger 131 may engage a portion of the hitch receiver tuber 14 creating a generally tight fit between the adapter 106 and the hitch receiver tube 14. This may allow the adapter 106 to be appropriately positioned within the hitch receiver tube 14. Still further, the finger 131 being elastic may generally dampen vibrations that may occur during operation of the vehicle 64.

The adapter 106 with mounting bracket 40 may be inserted into the hitch receiver tube 14 and the fingers 131 may generally hold the adapter 106 within the hitch receiver tube 14. Either of the locking aperture 70 or the second locking aperture 74 of the mounting bracket 40 may generally align with the locking pin aperture 15 of the hitch receiver tube 14. The locking pin 16 may then be inserted into and through the locking pin aperture 15 and either of the locking aperture 70 or the second locking aperture 74 generally securing the adapter 106 and mounting bracket 40 with the hitch receiver tube 14. This may secure the universal bracket with adaptable hitch cover 10 with the hitch receiver tube 14.

The finger 131 being compressed toward the adapter 106 may also allow the universal bracket with an adaptable hitch cover 100 to be selectively removed from the hitch receiver tube 14. In some embodiments, the adapter 106 may be pulled outward from the hitch receiver tube 14. As the adapter 106 is so pulled, the finger 131 may compress toward the adapter 106 generally releasing the engagement between the finger 131 and the hitch receiver tube 14 such that the universal bracket with an adaptable hitch cover 100 may be selectively removed.

In some embodiments, the universal bracket with an adaptable hitch cover 100 may be shaped and sized such that it may be capable of selectively engaging hitch receiver tubes 14 of a dimension $D_2$, such as by way of a non-limiting example, a 2" (Class III/IV) and/or 2½" (Class V) hitch receiver tubes 14 of dimension $D_2$. By way of a non-limiting example, the adapter 106 may be of a shape and size such that it may be capable of being inserted into Class III/IV and/or V hitch receiver tubes 14. The biasing of the finger 131 toward the hitch receiver tube 14 may permit a tight fit between the universal bracket with an adaptable hitch cover 100 and the hitch receiver tube 14 even when adapter 106 may be smaller than the hitch receiver tube 14. Specifically, the adapter 106 may have a width $W_2$ that may be greater than the width $W_1$ of the mounting bracket 40; see FIG. 7, which may allow the universal bracket with an adaptable hitch cover 100 to operatively fit with the larger Class III/IV and V hitch receiver tubes 14 having the dimension $D_2$, whereby $D_2$ may be larger than $D_1$. The biasing of the fingers 131 toward the hitch receiver tube 14 may permit a tight fit between the universal bracket with an adaptable hitch cover 100 and the hitch receiver tube 14 even when the adapter 106 may have a width $W_2$ that may be smaller than other brackets that may fit snugly within the hitch receiver tube 14. Still further, the biasing of the fingers 131 may allow for a generally tight fit of the adapter 106 regardless of whether the hitch receiver tube 14 may be 2" or 2½" in size. The fingers 131 may be biased enough that they may permit the adapter 106 to snugly fit within either sized hitch receiver tube 14.

In operation in those situations in which the universal bracket with an adaptable hitch cover 100 may need to be attached to a Class I/II hitch receiver tube 14 having the dimension $D_1$, the adapter 106 may be removed from the mounting bracket 40 forming the universal bracket with an adaptable hitch cover 10. In this situation, the mounting bracket 40 may be of a shape and size to fit within the Class I/II hitch receiver tube 14. In those situations in which the universal bracket with an adaptable hitch cover 10 may need to be attached to any one of a Class III/IV and/or V hitch receiver tube 14 having the dimension $D_2$, the adapter 106 may be attached to the mounting bracket 40 as described above. This may provide an opportunity to have a universal bracket that may be capable of being selectively secured to any one of Class I through V hitch receiver tubes.

The modularity of the universal bracket with an adaptable hitch cover 100, i.e., the face plate 20 being capable of being selectively removable from the mounting bracket 40 and the adapter 106 being selectively removable from the mounting bracket 40, may allow the universal bracket with adaptable hitch cover 100 to be efficiently packaged. By way of a non-limiting example, the face plate 20 and adapter 106 may both be detached from the mounting bracket 40 in the applicable packaging. This selective detachability of the face plate 20 and adapter 106 with the mounting bracket 40 may permit the packaging thereof to be more efficient, e.g., this may result in a smaller overall package size as opposed to packaging the face plate 20 and adapter 106 attached with the mounting bracket 40. This smaller package size may take up less space on store shelves. It may also be easier for a user to handle and may allow the manufacturer thereof to transport such more efficiently as more of the product may be capable of being packaged in a smaller space.

Still further, the universal bracket with an adaptable hitch cover 100 being capable of selectively attaching to hitch receiver tubes of different sizes may result having to produce a single design as opposed to having to produce multiple different sized and shaped hitch covers. The universal bracket with adaptable hitch cover 100 may result in generally eliminating additional production lines, separate packaging designs and additional inventory tracking systems.

Embodiments of a universal bracket with an adaptable hitch cover 200 are shown in FIGS. 14-22. The universal bracket with adaptable hitch cover 200 may include a base/face plate 220. The face plate 220 may include first and second surfaces 224, 228. The first surface 224 may include any appropriate design or indicia, such as by way of a non-limiting example, a contoured or three-dimensional surface having a desired shape or configuration (such as a basketball as shown), a logo, a name, an image, or any combination of such. In some embodiments, an indicia member 229 may be selectively attached with the face plate 220 in any appropriate manner. The indicia member 229 may include, by way of a non-limiting example, a contoured or three-dimensional surface having a desired shape or configuration (such as a basketball as shown), a logo, a name, an image, or any combination of such. Moreover, the indicia member 229 may include a light, an operating component, such as a bottle opener or the like. The indicia member 229 may, by way of a non-limiting example, be fastened with the face plate 220. The user may attach, detach, and attach a different indicia member 229 without having to replace the entire universal bracket with adaptable hitch cover 200. Further, still the user may replace the indicia member 229 without having to remove the universal bracket with adaptable hitch cover 200 from the hitch receiver tube 14. This may allow the user to change graphics, decals, indicia or other art work with any other graphic, decal, indicia or art work that they choose, which may provide customization to the universal bracket with adaptable hitch cover 200.

The second surface 228 may include at least one engagement member 230. In some embodiments, the second surface 228 may include four engagement members 230; see FIG. 14. While four engagement members 230 may be shown and described, the present teachings are not limited to such—any appropriate number of engagement members 230 may be used without departing from the present teachings. The engagement members 230 may include a plurality of hooks 234 that may be appropriately spaced on the second surface 228 of the face plate 220. The hooks 234 may be attached in any appropriate manner.

The universal bracket with an adaptable hitch cover 200 may include a mounting bracket 240 that may be selectively attached to the face plate 220. In particular, the mounting bracket 240 may be selectively attached the second surface 228 of the face plate 220. The mounting bracket 240 may be selectively attached to the engagement members 230 of the second surface 228 of the face plate 220. The mounting bracket 240 may include a base 242 that may be of a shape and size that it may be capable of selectively engaging the engagement members 230 in any appropriate manner.

The base 242 may be integrally formed with the mounting bracket 240 as a monolithic unit or may be attached thereto through a subsequent operation. By way of a non-limiting example, the base 242 may be of a generally rectangular shape. The base 242 may include openings 243 that may selectively engage the engagement members 230. For example, the openings 243 may be shaped and sized such that the hooks 234 may selectively engage the openings 243 generally securing the mounting bracket 240 with the second surface 228 of the face plate 220; see FIGS. 15 and 16. The base 242 may be positioned toward the second surface 228 of the face plate 220 generally aligning openings 243 with the hooks 234, as shown by arrow 245. A force may be applied as in the direction of the arrow 260, which may position the openings 243 with the hooks 234.

The hooks 234 may also be disengageable with the base 242 of the mounting bracket 240 such that the mounting bracket 240 may be selectively disengaged from the face plate 220, i.e., the mounting bracket 240 and the face plate 220 may be modular. A different face plate may be attached to the mounting bracket 240 as required or desired. This may allow the face plate 220 to be packaged disengaged from the mounting bracket 240 and may allow a user to store the face plate 220 separate from the mounting bracket 240.

The mounting bracket 240 may include first and second housings 244, 248. The first housing 244 may include a first interlocking feature 250 and the second housing 248 may include a second interlocking feature 252. The second interlocking feature 252 may be capable of selectively engaging the first interlocking feature 250 for the purpose of interlocking the first and second housings 244, 248, which may form the mounting bracket 240 as well as the base 242.

The first interlocking feature 250 may include a groove 256 extending along a perimeter 257 of the first housing 244 and the second interlocking feature 252 may include a matingly shaped and sized tongue 258 extending along a perimeter 259 of the second housing 248. The tongue 258 may selectively and operatively engage the groove 256. It should be understood, however, that the first and second interlocking features 250, 252 may include any appropriate matingly engaging features and are not limited to that shown and described herein. By way of a non-limiting example, the first and second interlocking features 250, 252 may be a male and female snap fit features, male and female dovetail features, or any other appropriate matingly engaging features. Further, while the first interlocking feature 250 is described as a female engaging member and the second interlocking feature 252 is a male engaging member, they may be structured in an opposite manner, i.e., the first interlocking feature 250 is a male engaging member and the second interlocking feature 252 is a female engaging member.

Figure 14:
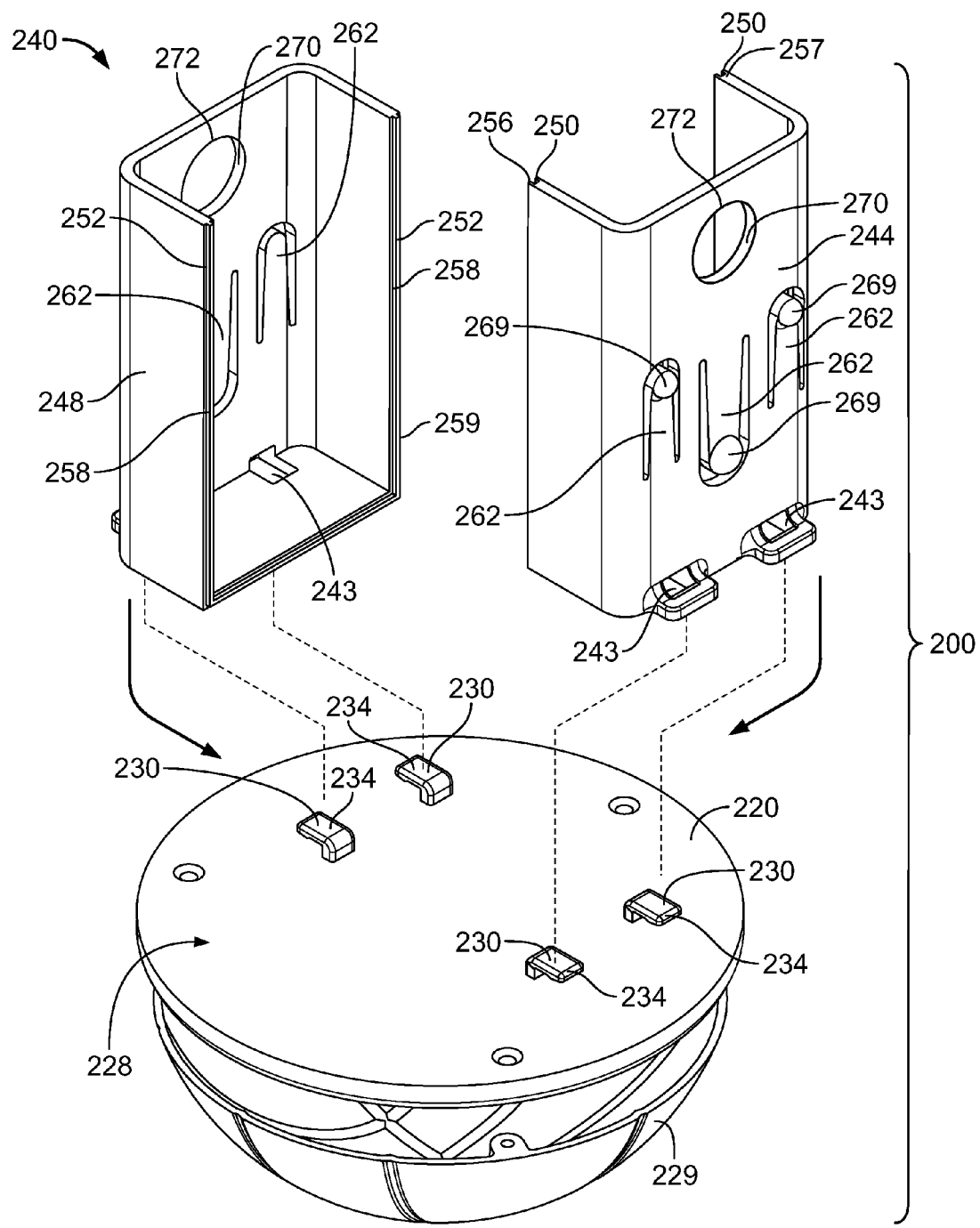
FIG. 14 is an exploded view of a mounting bracket for an adaptable hitch cover.
Figure 15:
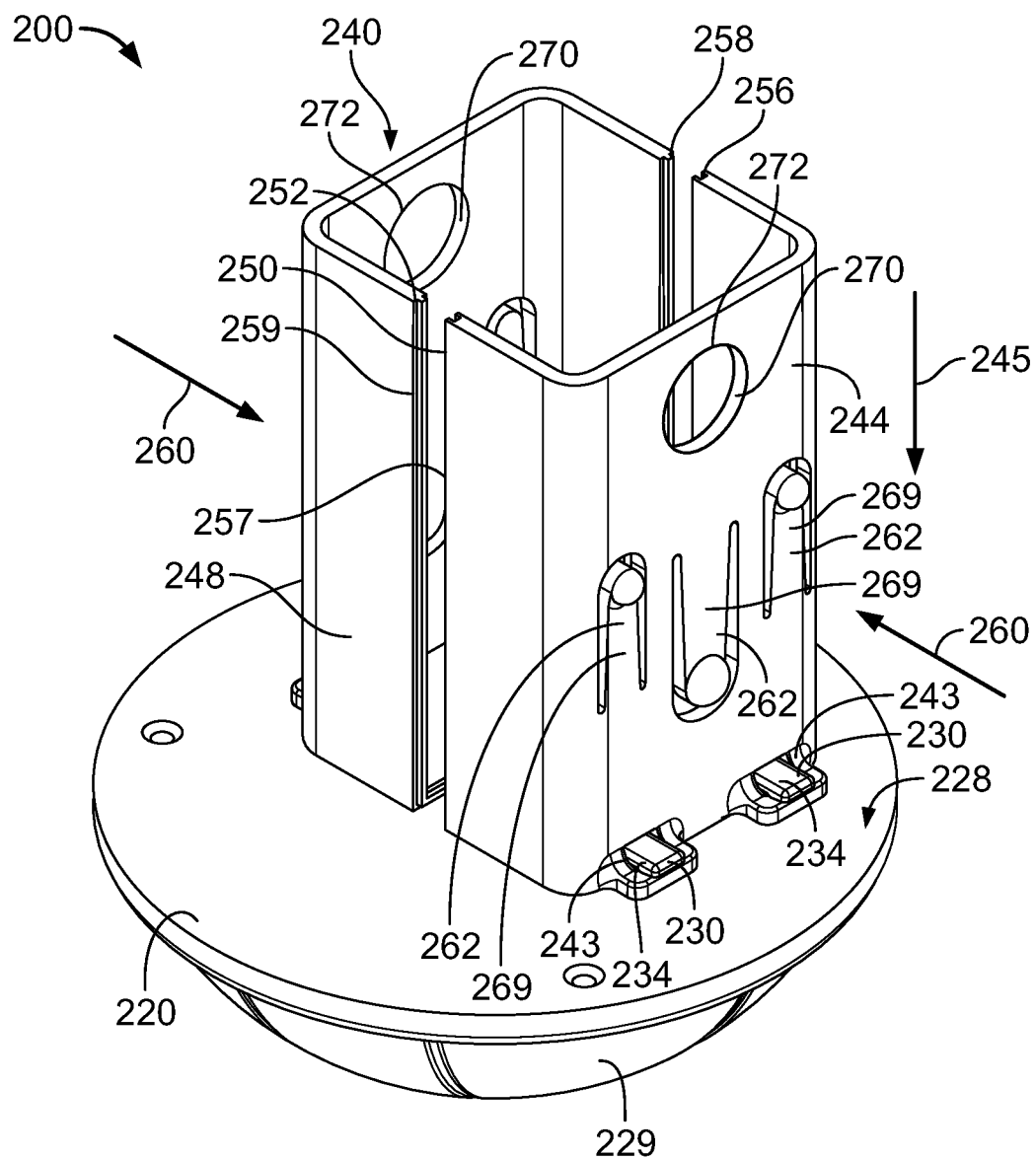
FIG. 15 is a partial exploded view of the mounting bracket for an adaptable hitch cover of FIG. 14.
Figure 16:
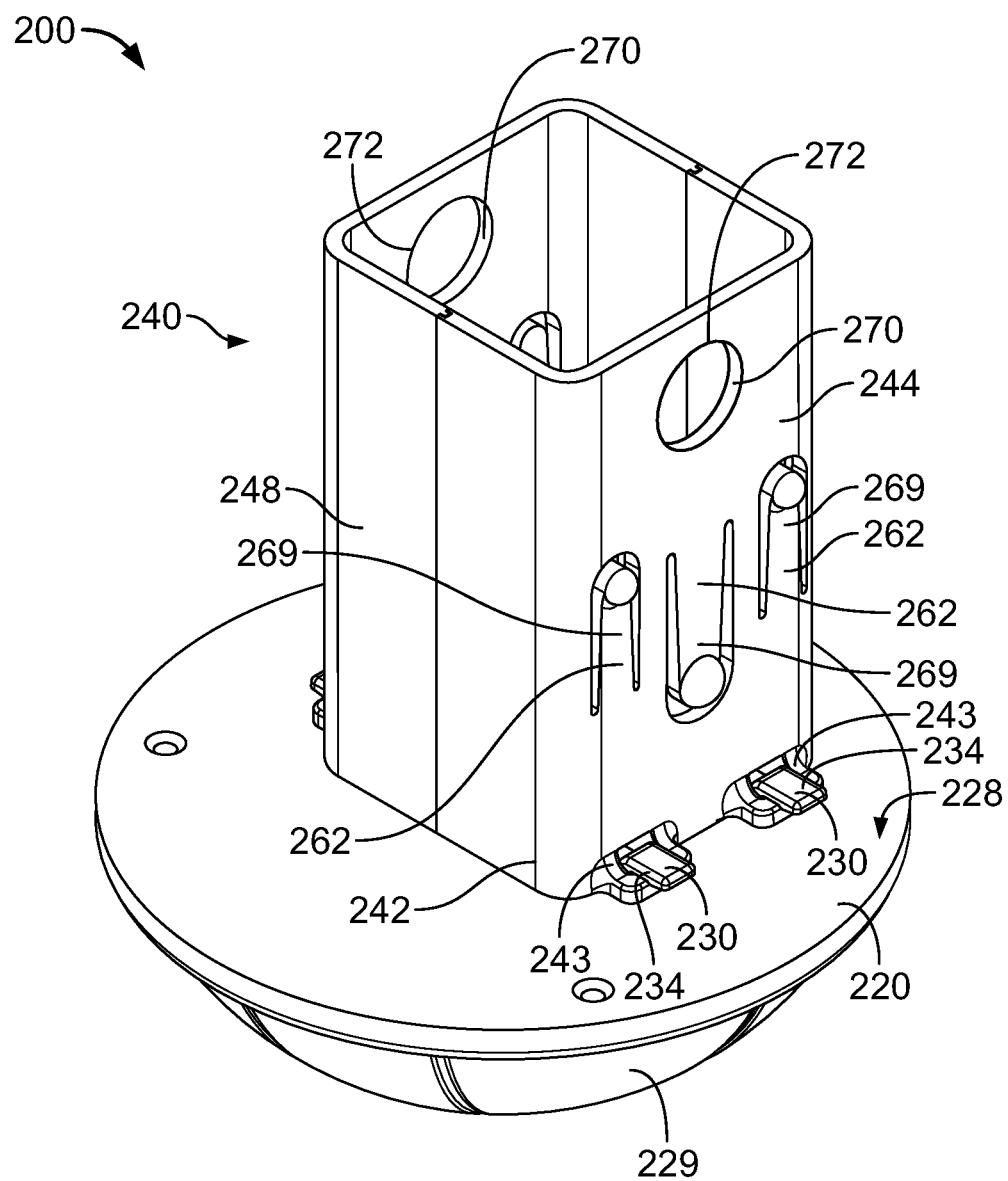
FIG. 16 is a perspective view of the mounting bracket for an adaptable hitch cover.
Figure 17:
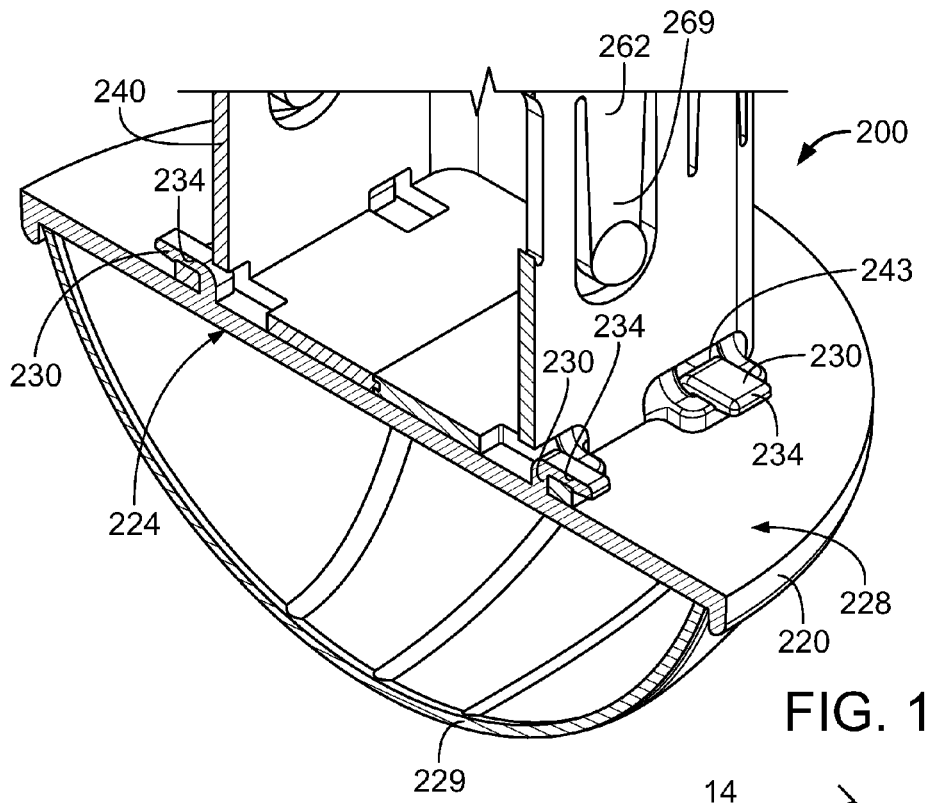
FIG. 17 is a partial cross-sectional view of a portion of the mounting bracket for an adaptable hitch cover.
Figure 18:
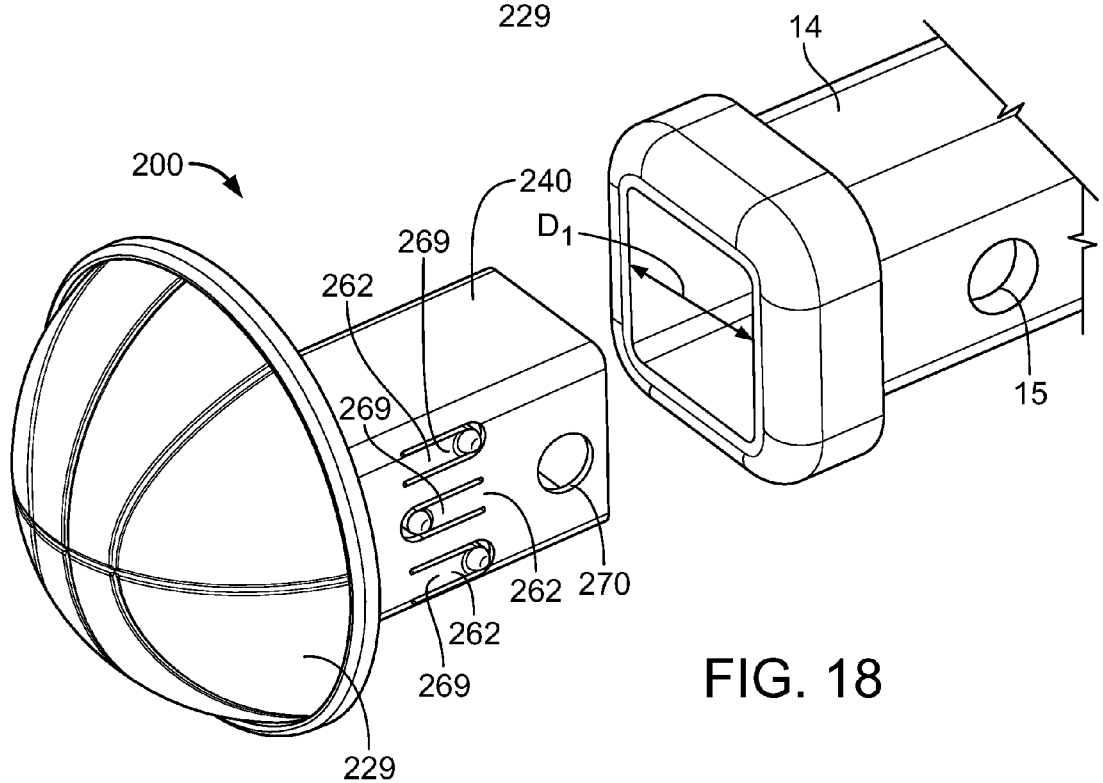
FIG. 18 is a perspective view of the mounting bracket for an adaptable hitch cover being inserted into a hitch receiver tube of a vehicle.
Figure 19:
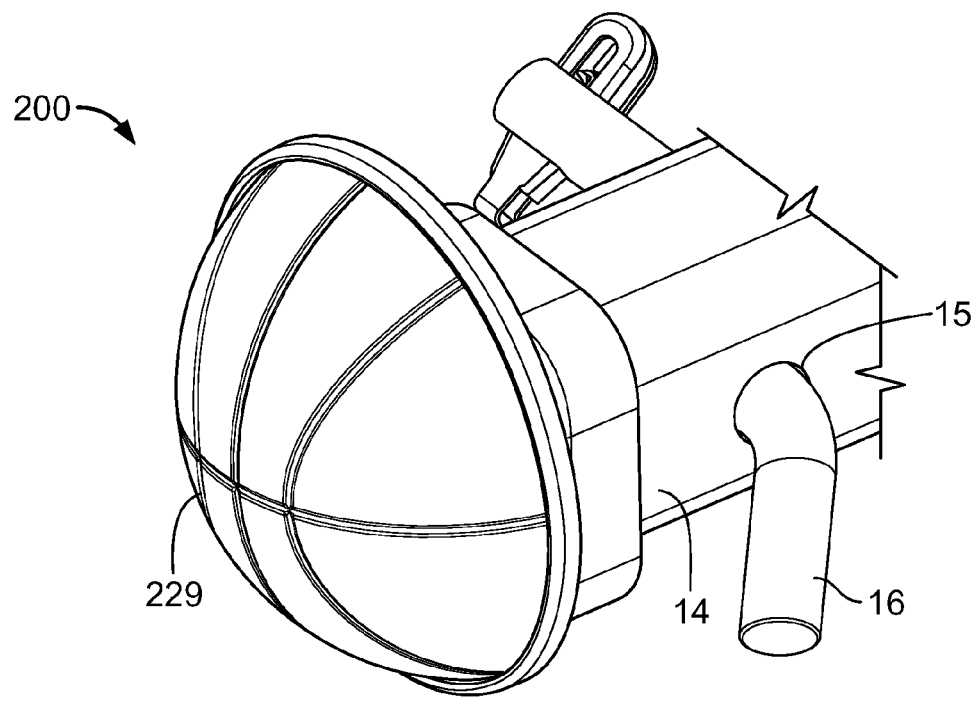
FIG. 19 is a perspective view of the mounting bracket for an adaptable hitch cover selectively secured to the hitch receiver tube.
Figure 20:
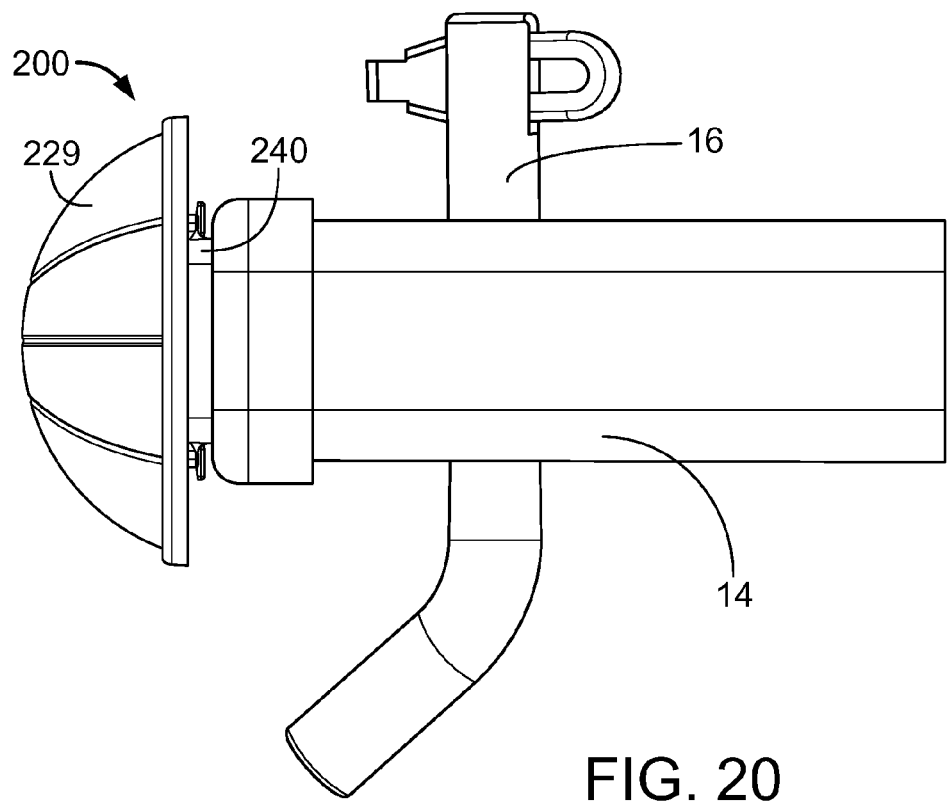
FIG. 20 is a plan view of the mounting bracket for an adaptable hitch cover selectively secured to the hitch receiver tube.
Figure 21:
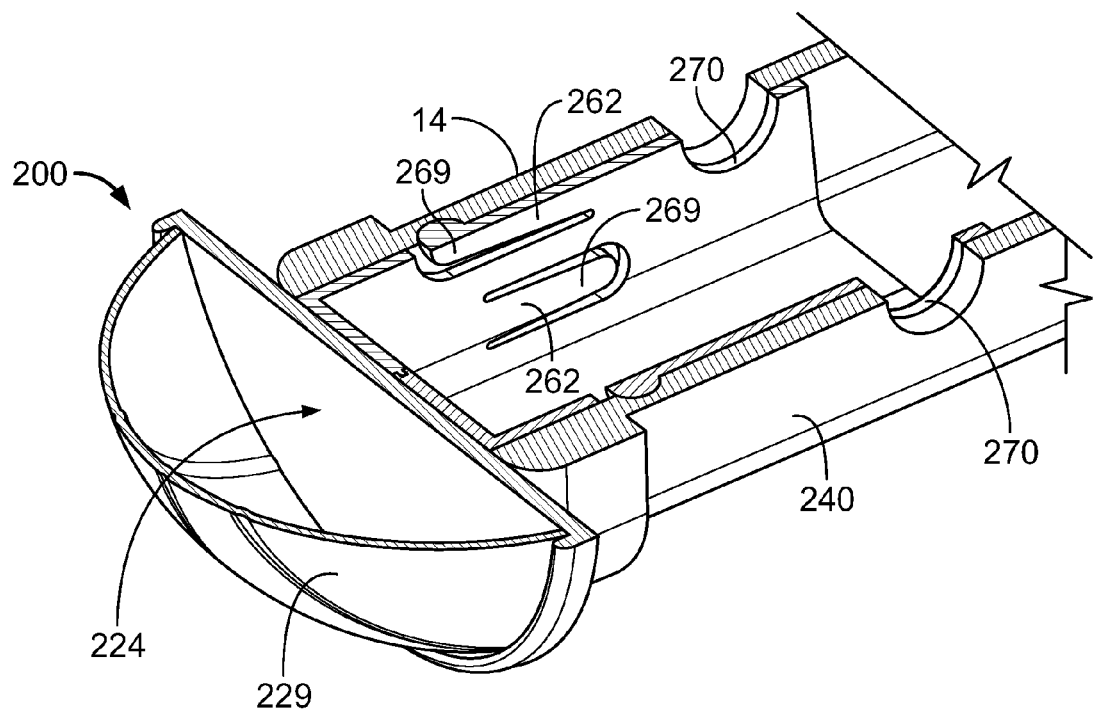
FIG. 21 is a cross-sectional view of the mounting bracket for an adaptable hitch cover selectively inserted into the hitch receiver tube of a vehicle.
Figure 22:
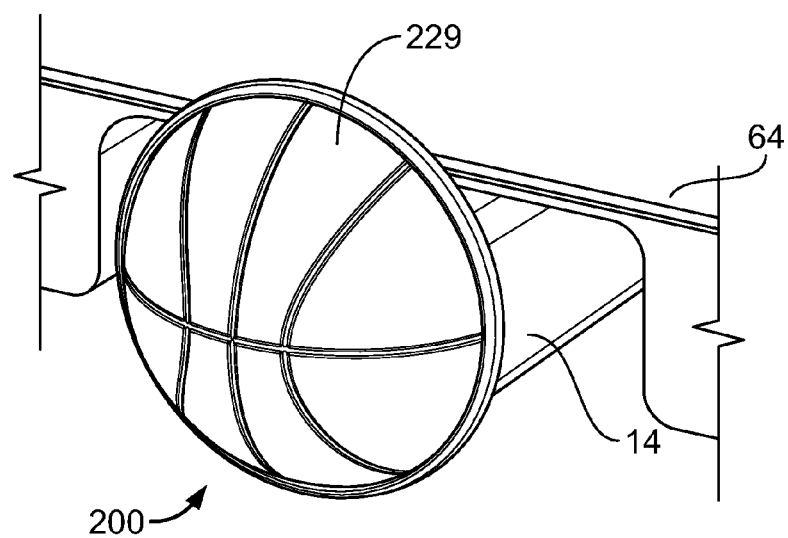
FIG. 22 is a perspective view of the mounting bracket for an adaptable hitch cover selectively secured to the hitch receiver tube of a vehicle.

The mounting bracket 240 may include at least one anti-rattle member 262—as shown in FIGS. 14-16, the mounting bracket 240 may include six such anti-rattle devices 262. The anti-rattle member 262 may generally fill a gap between the mounting bracket 240 and the interior surface of hitch receiver tube 14 in which it may be inserted that may have otherwise been present. Filling the gap may create a snug fit between the universal bracket with an adaptable hitch cover 10 and the hitch receiver tube 14. Further, the anti-rattle members 262 may be generally flexible, such that they may be capable of biasing in an appropriate direction. The biasing of the anti-rattle members 262 may allow for absorption of vibration due to road conditions during operation of the vehicle 64 to which the hitch receiver tube 14 may be attached.

The anti-rattle member 262 may each include a finger or tab 269 that may be biased away from the mounting bracket 240 or may include a portion extending above the first and second housing 244, 248, such as by way of a non-limiting example a bulb end. The finger 269 may be attached to the mounting bracket 240 in any appropriate manner or may be integrally formed therewith as a monolithic unit. Each of the first and second housing 244, 248 may include six such anti-rattle members 262, i.e., each of the first and second housing 244, 248 may include three of the fingers 269.

The fingers 269 may be capable of being compressed toward the mounting bracket 240 when the mounting bracket 240 is being inserted into the hitch receiver tube 14. In such situations, the fingers 269 may be depressed or biased downward such that the mounting bracket 240 may be selectively inserted into the hitch receiver tube 14. Once appropriately positioned within the hitch receiver tube 14, the fingers 269 may bias toward the hitch receiver tube 14. In biasing toward the hitch receiver tube 14, the fingers 269 may engage a portion of the hitch receiver tube 14 creating a generally tight fit, e.g., a tight friction fit, between the mounting bracket 240 and the hitch receiver tube 14. This may allow the mounting bracket 240 to be appropriately positioned within the hitch receiver tube 14. Still further, the fingers 269 being elastic may generally dampen vibrations that may occur during operation of the vehicle 64.

The mounting bracket 240 may include at least one locking aperture 270 that may be shaped and sized to accept the locking pin 16. The locking aperture 270 may extend through both sides of the mounting bracket 240. Specifically, each of the first and second housings 244, 248 may include apertures 272 such that when the first and second housings 244, 248 are engaged together as described above, the apertures 272 form the locking aperture 270. The locking aperture 270 may be positioned on the mounting bracket 240 such that it may generally align with the applicable locking pin aperture 15 of the hitch receiver tube 14 when the mounting bracket 240 is inserted into the hitch receiver tube 14.

The mounting bracket 240 may be inserted into the hitch receiver tube 14 and the fingers 269 may generally permit a tight fit between the mounting bracket 240 and the hitch receiver tube 14. The locking aperture 270 may generally align with the locking pin aperture 15 of the hitch receiver tube 14. The locking pin 16 may be inserted into and through the locking pin aperture 15 and the locking aperture 270 generally securing the mounting bracket 240 with the hitch receiver tube 14. This may secure the universal bracket with adaptable hitch cover 200 with the hitch receiver tube 14.

The fingers 269 may be compressed toward the mounting bracket 240, which may also allow the universal bracket with an adaptable hitch cover 200 to be selectively removable from the hitch receiver tube 14. In such situation, the locking pin 16 may be withdrawn from the locking pin aperture 15 and the locking aperture 270. The mounting bracket 240 may be pulled outward from the hitch receiver tube 14. As the mounting bracket 240 is so pulled, the fingers 269 may compress toward the mounting bracket 240 generally releasing the engagement between the fingers 269 and the hitch receiver tube 14 such that the universal bracket with an adaptable hitch cover 200 may be selectively removed.

In some embodiments, the universal bracket with an adaptable hitch cover 200 may be shaped and sized such that it may selectively engage hitch receiver tubes 14 of a dimension $D_1$, such as by way of a non-limiting example, a 1¼" (Class I/II) hitch receiver tubes. By way of a non-limiting example, the mounting bracket 240 may be of a shape and size such that it may being inserted into and operatively engaged with Class I/II hitch receiver tubes 14—although it should be understood that the mounting bracket 240 may of a shape and size to engage a hitch receiver tube 14 of any size. The biasing of the fingers 269 toward the hitch receiver tube 14 may permit a tight fit between the universal bracket with an adaptable hitch cover 200 and the hitch receiver tube 14 even when the mounting bracket 240 may have a width $W_1$ that may be smaller than other mounting brackets that may fit snugly within the hitch receiver tube 14. This may allow the mounting bracket 240 and in turn the universal bracket with adaptable hitch cover 200 to snugly fit within a wide variety of hitch receiver tubes. Further, in some embodiments, the adapter 106 may be selectively attached to the universal bracket with an adaptable hitch cover 200 in order to modify the size thereof as described in more detail above.

The modularity of the universal bracket with an adaptable hitch cover 200, i.e., the face plate 220 capable of being selectively removable from the mounting bracket 240, may allow the universal bracket with adaptable hitch cover 200 to be efficiently packaged. By way of a non-limiting example, the face plate 220 may be detached from the mounting bracket 240 in the applicable packaging. This selective detachability of the face plate 220 with the mounting bracket 240 may permit the packaging thereof to be more efficient, e.g., this may result in a smaller overall package size as opposed to packaging the face plate 220 attached with the mounting bracket 240. This smaller package size may take up less space on store shelves. It may also be easier for a user to handle and may allow the manufacturer thereof to transport such more efficiently as more of the product may be capable of being packaged in a smaller space.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A hitch cover comprising:
   a base having first and second surfaces, the second surface having at least one engagement member attached thereto;

a mounting bracket selectively attached to the at least one engagement member of the base and extending from the second surface wherein the mounting bracket is configured to selectively engage a hitch receiver tube, the mounting bracket includes first and second housing members selectively attached together, the first and second housing members include interlocking features, whereby the interlocking features are selectively engaged to attach the first and second housings together;

at least one biasing member attached to the mounting bracket wherein the biasing member is configured to engage a portion of the hitch receiver tube and is configured to apply a biasing force to the hitch receiver tube, wherein the biasing member is configured to generally dampen vibration between the hitch receiver tube and the mounting bracket; and an aperture positioned in the mounting bracket and configured to accept a locking pin configured to lock the mounting bracket with the hitch receiver tube.

2. The hitch cover of claim 1, wherein the interlocking features are either one of a tongue and a corresponding groove.

3. The hitch cover of claim 1, wherein the at least one engagement member includes a plurality of hooks attached to the second surface of the base.

4. The hitch cover of claim 3, wherein the hooks are monolithically formed with the second surface of the base.

5. The hitch cover of claim 1, wherein the biasing member includes a flexible finger monolithically formed with the mounting bracket, wherein the flexible finger is configured to absorb vibrations.

6. The hitch cover of claim 1, further comprising an adapter capable of selectively engaging and generally circumscribing at least a portion the mounting bracket, wherein the adapter is configured to selectively engage a second hitch receiver tube having a second size and the mounting bracket is configured to selectively engage the hitch receiver tube having a first size, wherein the second size of the second hitch receiver tube is greater than the first size of the first hitch receivertube.

7. The hitch cover of claim 6, wherein the adapter includes at least one adapter biasing member, whereby the adapter biasing member is configured to engage a portion of the second hitch receiver tube generally dampening vibrations between the second hitch receiver tube and the adapter.

8. The hitch cover of claim 1, wherein the first and second housing members form a continuous cross sectional perimeter once the interlocking features are selectively engaged.

9. The hitch cover of claim 8, wherein the continuous cross sectional perimeter of the first and second housing members has a shape that is generally rectangular.

10. A hitch cover comprising:
a base;
a mounting bracket selectively attached to the base and extending therefrom, wherein the mounting bracket is configured to selectively engage a first hitch receiver tube having a first size;
an adapter capable of selectively engaging and generally circumscribing at least a portion of the mounting bracket, wherein the adapter is configured to selectively engage a second hitch receiver tube having a second size, the second size of the second hitch receiver tube being greater than the first size of the first hitch receiver tube; and
a first biasing member attached to the mounting bracket, wherein the first biasing member is configured to apply a biasing force to the adapter generally securing the adapter relative to the mounting bracket.

11. The hitch cover of claim 10, wherein the mounting bracket includes first and second housing members selectively interlocked together.

12. The hitch cover of claim 11, wherein the base includes first and second surfaces, the second surface having a plurality of engagement members selectively attachable to the mounting bracket.

13. The hitch cover of claim 10, further comprising a second biasing member attached with the adapter, wherein the second biasing member is configured to apply a biasing force against the second hitch receiver tube and absorb vibrations from the second hitch receiver tube.

14. A hitch cover comprising:
a face plate having at least one engagement member;
a mounting bracket selectively engageable with the at least one engagement member of the face plate, wherein the mounting bracket is configured to selectively engage a hitch receiver tube having a first size;
an aperture positioned on the mounting bracket, the aperture configured to accept a locking pin configured to lock the mounting bracket with the hitch receiver tube; and
at least one biasing member attached to the mounting bracket, wherein the biasing member is configured to engage a portion of the hitch receiver tube, the at least one biasing member is configured to apply a biasing force to the hitch receiver tube, wherein the biasing member is configured to generally dampen vibration between the hitch receiver tube and the mounting bracket.

15. The hitch cover of claim 14, wherein the at least one biasing member includes a flexible finger monolithically formed with the mounting bracket.

16. The hitch cover of claim 14, further comprising an adapter selectively engageable with at least a portion of the mounting bracket, wherein the adapter is configured to selectively attach to a second hitch receiver tube having a second size, the second size being greater than the first size.

17. The hitch cover of claim 16, wherein the at least one biasing member is configured to apply a biasing force to the adapter generally securing the adapter relative to the mounting bracket.

18. The hitch cover of claim 17, further comprising a second biasing member attached with the adapter, wherein the second biasing member is configured to apply a biasing force against the second hitch receiver tube and absorb vibrations from the second hitch receiver tube.

19. The hitch cover of claim 14, wherein the face plate and an adapter are disengaged from the mounting bracket when packaged.

* * * * *